United States Patent
Painter et al.

(10) Patent No.: US 8,639,831 B2
(45) Date of Patent: *Jan. 28, 2014

(54) METHOD AND APPARATUS FOR TRANSFERRING FILES TO CLIENTS USING A PEER-TO-PEER FILE TRANSFER MODEL AND A CLIENT-SERVER TRANSFER MODEL

(75) Inventors: Christopher Painter, Poway, CA (US); Frank Li-De Lin, San Diego, CA (US); Paul Hwang, Burbank, CA (US); Timothy S. Miller, San Diego, CA (US)

(73) Assignee: Sony Corporation, Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 13/084,039

(22) Filed: Apr. 11, 2011

(65) Prior Publication Data

US 2011/0191420 A1 Aug. 4, 2011

Related U.S. Application Data

(63) Continuation of application No. 11/726,956, filed on Mar. 23, 2007, now Pat. No. 7,945,689.

(51) Int. Cl.
*G06F 15/16* (2006.01)

(52) U.S. Cl.
USPC .......... 709/231; 709/203; 709/219; 709/223; 709/232

(58) Field of Classification Search
USPC ......... 709/203, 217, 223, 231, 238, 218, 232; 714/4
See application file for complete search history.

(56) References Cited

U.S. PATENT DOCUMENTS

| | | | |
|---|---|---|---|
| 6,065,062 A | 5/2000 | Periasamy et al. | |
| 6,292,834 B1 | 9/2001 | Ravi et al. | |
| 6,600,721 B2 | 7/2003 | Edholm | |
| 7,010,534 B2 | 3/2006 | Kraft | |
| 7,089,290 B2 * | 8/2006 | Hennessey et al. | 709/218 |

(Continued)

FOREIGN PATENT DOCUMENTS

| | | |
|---|---|---|
| CN | 1372407 A | 10/2002 |
| EP | 1324546 A1 | 7/2003 |
| EP | 1643716 A1 | 5/2006 |
| EP | 1615403 A1 | 11/2006 |

OTHER PUBLICATIONS

Venkata N. Padmanabhan et al., "The case for cooperative networking," Microsoft Research, Carnegie Mellon University, Mar. 2002, 2 pages, http://www.research.microsoft.com/%7Epadmanab/papers/iptps02-with-addendurn.pdf.

(Continued)

*Primary Examiner* — Ramy Mohamed Osman
(74) *Attorney, Agent, or Firm* — Sony Corporation

(57) ABSTRACT

A method and apparatus is provided for delivering a content file to a client over a packet-switched network. The method begins by determining a suitable throughput required to deliver the content file to the client. Next, the throughput available in a peer-to-peer network for delivering the content file to the client is determined. The required throughput is compared to the available throughput. If the available throughput is less than the required throughput, the available throughput is supplemented with additional throughput. The content is then delivered to the client over the packet-switched network using the available throughput of the peer-to-peer network and the additional throughput.

14 Claims, 4 Drawing Sheets

(56) References Cited

U.S. PATENT DOCUMENTS

| | | |
|---|---|---|
| 7,103,645 B2 | 9/2006 | Leighton et al. |
| 7,325,073 B2 * | 1/2008 | Shao et al. .................... 709/238 |
| 7,577,750 B2 | 8/2009 | Shen et al. |
| 7,584,285 B2 * | 9/2009 | Hudson et al. ................ 709/225 |
| 7,660,906 B1 | 2/2010 | Armour |
| 7,945,689 B2 * | 5/2011 | Painter et al. ................. 709/231 |
| 7,949,641 B1 * | 5/2011 | Eatough ....................... 707/705 |
| 8,316,406 B2 * | 11/2012 | Lin et al. ....................... 709/219 |
| 8,332,484 B2 * | 12/2012 | Afergan et al. .............. 709/239 |
| 2002/0059619 A1 | 5/2002 | Lebar |
| 2002/0147815 A1 | 10/2002 | Tormasov et al. |
| 2002/0156910 A1 | 10/2002 | Senda |
| 2002/0194108 A1 | 12/2002 | Kitze |
| 2002/0198930 A1 * | 12/2002 | Jones et al. ................... 709/201 |
| 2003/0014759 A1 * | 1/2003 | Van Stam ....................... 725/32 |
| 2003/0145093 A1 * | 7/2003 | Oren et al. .................... 709/219 |
| 2003/0217158 A1 * | 11/2003 | Datta ............................ 709/228 |
| 2004/0143672 A1 | 7/2004 | Padmanabham et al. |
| 2004/0148424 A1 * | 7/2004 | Berkson et al. ............... 709/236 |
| 2004/0205162 A1 | 10/2004 | Parikh |
| 2004/0236863 A1 | 11/2004 | Shen et al. |
| 2005/0160133 A1 | 7/2005 | Greenlee et al. |
| 2005/0193114 A1 | 9/2005 | Colby et al. |
| 2005/0198290 A1 | 9/2005 | Berkey et al. |
| 2005/0203851 A1 | 9/2005 | King et al. |
| 2005/0268102 A1 | 12/2005 | Downey |
| 2006/0007947 A1 | 1/2006 | Li et al. |
| 2006/0020684 A1 | 1/2006 | Mukherjee et al. |
| 2006/0029093 A1 | 2/2006 | Van Rossum |
| 2006/0107286 A1 * | 5/2006 | Connor et al. ................... 725/31 |
| 2006/0140134 A1 | 6/2006 | O'Brien et al. |
| 2006/0143293 A1 | 6/2006 | Freedman |
| 2006/0149828 A1 | 7/2006 | Kikinis |
| 2006/0168088 A1 | 7/2006 | Leighton et al. |
| 2006/0179143 A1 | 8/2006 | Walker et al. |
| 2006/0282522 A1 | 12/2006 | Lewin et al. |
| 2007/0005694 A1 | 1/2007 | Popkin et al. |
| 2007/0028133 A1 | 2/2007 | Izutsu et al. |
| 2007/0038578 A1 | 2/2007 | Liu et al. |
| 2007/0067485 A1 | 3/2007 | Stotland et al. |
| 2007/0223453 A1 * | 9/2007 | Takase et al. ................. 370/352 |
| 2007/0288593 A1 * | 12/2007 | Wang ............................ 709/217 |
| 2008/0077635 A1 | 3/2008 | Sporny et al. |
| 2008/0089299 A1 | 4/2008 | Lindsley et al. |
| 2008/0098123 A1 | 4/2008 | Huang et al. |
| 2008/0235331 A1 | 9/2008 | Melamed et al. |
| 2008/0235391 A1 * | 9/2008 | Painter et al. ................. 709/232 |
| 2009/0157850 A1 | 6/2009 | Gagliardi et al. |

OTHER PUBLICATIONS

Chris Dana et al., "BASS: BitTorrent Assisted Streaming System for Video-on-Demand," 2005 IEEE 7th Workshop on Multimedia Signal Processing, Oct. 1, 2005, pp. 1-4.

Dongyan Xu et al., "Analysis of a CDN-P2P Hybrid Architecture for Cost-Effective Streaming Media Distribution", Multimedia Systems, Mar. 17, 2006, vol. 11, No. 4, pp. 383-399, Springer, Berlin, DE.

* cited by examiner

METHOD AND APPARATUS FOR TRANSFERRING FILES TO CLIENTS USING A PEER-TO-PEER FILE TRANSFER MODEL AND A CLIENT-SERVER TRANSFER MODEL

STATEMENT OF RELATED APPLICATIONS

This application is a continuation application of U.S. patent application Ser. No. 11/726,956, filed Mar. 23, 2007, entitled "Method and Apparatus for Transferring Files to Clients Using a Peer-to-Peer File Transfer Model and a Client-Server Transfer Model" which is hereby incorporated by reference in its entirety.

FIELD OF THE INVENTION

The present invention relates generally to techniques for delivering content to one or more clients over a packet-switched network such as the Internet, and more particularly to a method and apparatus using peer-to-peer networks and content delivery network (CDNs) to deliver content to clients.

BACKGROUND OF THE INVENTION

The providers of popular, large digital files, such as software, music or video files, must keep pace with the ever increasing bandwidth demands for delivering such files. As the popularity of a file increases, a larger number of users request the file and more bandwidth is required to deliver the file. With conventional Hypertext Transfer Protocol (HTTP) file delivery techniques, for example, the bandwidth requirements increase linearly with the number of requesting users, and quickly becomes prohibitively expensive.

Accordingly, there is a continuing need to improve the delivery of content to users over communications networks such as the Internet.

SUMMARY OF THE INVENTION

In accordance with the present invention, a method and apparatus is provided for delivering a content file to a client over a packet-switched network. The method begins by determining a suitable throughput required to deliver the content file to the client. Next, the throughput available in a peer-to-peer network for delivering the content file to the client is determined. The required throughput is compared to the available throughput. If the available throughput is less than the required throughput, the available throughput is supplemented with additional throughput. The content is then delivered to the client over the packet-switched network using the available throughput of the peer-to-peer network and the additional throughput.

In accordance with one aspect of the invention, the additional throughput may be provided by a backup server that is employed as a peer in the peer-to-peer network on an as-needed basis.

In accordance with another aspect of the invention, the additional throughput may be provided by a content delivery network.

In accordance with another aspect of the invention, delivery of the content to the client may further include delivering one portion of the content file over the peer-to-peer network and a remaining portion of the content file over the content delivery network.

In accordance with another aspect of the invention, the peer-to-peer network may operate in accordance with a file transfer protocol selected from the group consisting of BitTorrent, Kazaa, eDonkey, Gnutella, and Direct Connect.

In accordance with another aspect of the invention, the backup server may be configured to function as a seed client.

In accordance with another aspect of the invention, a determination is made of a delivery method to be employed in connection with the content file.

In accordance with another aspect of the invention, the delivery method is selected from the group consisting of a streaming media method or a file downloading method.

In accordance with another aspect of the invention, a method is provided for delivering a content file to a client over a packet switched-network. The method begins by delivering at least one portion of the content file over the packet-switched network using a peer-to-peer file transfer model. The method continues by delivering a remaining portion of the content file over the packet-switched network using a client-server file transfer model.

In accordance with another aspect of the invention, a method is provided for receiving a content file over a packet-switched network. The method begins by receiving at least one portion of the content file over the packet-switched network using a peer-to-peer file transfer model. The method continues by receiving a remaining portion of the content file over the packet-switched network using a client-server file transfer model.

DETAILED DESCRIPTION

Figure 1:
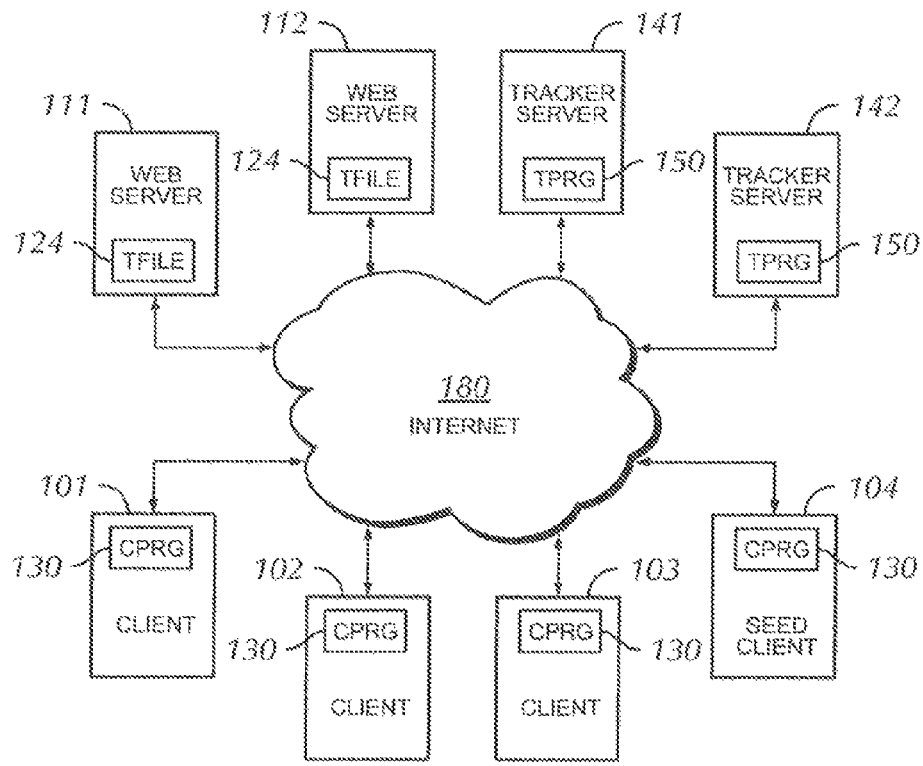
FIG. 1 shows a high level block diagram of one example of a peer-to-peer file sharing network

As described in more detail below, the present invention can employ both a client-server or content delivery network model and a peer-to-peer file transfer model to transfer content files from a content originator to multiple clients. The content file may be include, without limitation, data, video, audio, html pages and associated embedded objects, and any combinations thereof. In particular, the invention can dynamically choose which download model is most appropriate at any given time for any particular content file that a client wishes to download. Before describing various features of the invention in greater detail, a description of both a peer-to-peer network and a content delivery network will be presented. For clarity of discussion, the two models with be discussed separately with reference to FIGS. 1 and 2.

The most common method by which files are transferred on the Internet is the client-server model. A central server sends the entire file to each client that requests it—both http and ftp operate in this manner. The clients only communicate with the server and not with each other. The main advantage of the client-server model is its simplicity—a user logs onto a server and initiates the download process. Additionally, files are usually available for long periods of time as the servers tend to be dedicated to the task of serving, and are always on and connected to the Internet. Another important advantage of the client-server model is that the Quality of Service provided to the client, in terms of data throughput and latency, is largely controlled by the server and can be effectively guaranteed. In this context, throughput refers to the amount of actual user data (i.e., payload) transmitted per unit time without the overhead of protocol information such as start and stop bits, TCP/IP overhead, HTTP headers, and the like. Throughput can vary with time and depends on a variety of factors such as bandwidth, latency (i.e., the minimum time needed to send the smallest possible amount of data), payload size, packet size, network load, the number of hops required, and so on.

However, the client-server model has significant problems with files that are large and/or very popular such as newly released content. In particular, a great deal of bandwidth and server resources must be dedicated to distributing each file, since the server must transmit the entire file to each client. As a result, the server is burdened with the entirety of the content delivery costs. Because of these problems content providers sometimes employ so-called content delivery service providers (CDSPs) to efficiently deliver the content on their behalf. The CDSP operates a Content Delivery Network (CDN), which is a network of geographically distributed content delivery nodes that are arranged for efficient delivery of content on behalf of third party content providers. A request from a requesting end user for a given content file is directed to a "best" replica, where "best" usually means that the item is served to the client quickly compared to the time it would take to fetch it from the content provider origin server. A content delivery network comprises a set of content delivery servers (CDSs) dispersed across the Internet, as well as a domain name server (DNS) infrastructure, which is used to route user requests to the nearest CDS. The DNS requests sent from the user browser need to be directed to the DNS of the CDSP. One technique is for the CDSP to "takeover" the DNS functionality of the origin site so as to become the "authoritative DNS" for the origin site. CDNs do not eliminate the problems inherent in the client-server model. Rather, they simply transfer the burden of downloading files from the originating content provider to a third party.

A number of techniques have been proposed for reducing the bandwidth demands of file delivery using a client-server model. For example, in a peer-to-peer content sharing model, sometimes referred to as "cooperative distribution," one or more users that have previously downloaded a file can share the file with other users. A cooperative distribution model allows a server to deliver large files in a reliable manner that scales with the number of requesting users. Among other benefits, cooperative distribution models exploit the underutilized upstream bandwidth of existing users. Current Examples of peer-to-peer networks include systems such as BitTorrent, Kazaa, eDonkey, Gnutella, Direct Connect and the like.

In the BitTorrent file distribution system, for example, content files are divided into blocks and users attempt to find peers that together contain all of the blocks. When multiple users are downloading the same file at the same time, the various users upload blocks of the file to each other. In other words, a BitTorrent user trades blocks of a file that the user has with other required blocks that other users have until the complete file is obtained. The key philosophy of BitTorrent is that users should upload (transmit outbound) at the same time they are downloading (receiving inbound). In this manner, network bandwidth is utilized as efficiently as possible and the cost of uploading a file is redistributed to the users of the file and the cost of hosting a popular file is more affordable. BitTorrent is designed to work better as the number of people interested in a particular file increases, in contrast to other file transfer protocols where more users tend to bog the system down.

Peer-to-peer content sharing models can reduce the costs associated with delivering content to the client because they leverage the available upstream bandwidth of the clients. In this way the bandwidth costs that would otherwise be associated with a centralized download server are greatly reduced. Unfortunately, the Quality of Service provided to the client cannot be guaranteed because it is not under the complete control of the content deliverer, but rather is highly dependent on the number of clients actively downloading the content and the uplink speeds of those clients.

Thus, the present inventor has recognized that neither the client server model, as represented by a content delivery network, for example, nor peer-to-peer models are completely satisfactory for the purpose of delivering content to clients. The methods, systems and techniques detailed below better utilize both file sharing techniques.

FIG. 1 shows a high level block diagram of one example of a peer-to-peer file sharing network in which individual nodes communicate over a packet switched network 180 such as the Internet. Although the methods described herein are generally applicable to all such networks supporting file sharing by client peers, the BitTorrent network protocol is used in the following description for illustrative purposes. However, the invention is equally applicable to other peer-to-peer networks, both decentralized and centralized, using any suitable protocol such Gnutella, eDonkey, KaZaA, Gnutella, Direct Connect and the like.

In FIG. 1, one or more servers, such as servers 111 and 112, serve as depositories of a file (TFILE) 124 that contains metadata concerning a content file that is to be shared among client nodes, such as clients 101-104. In the context of BitTorrent, the file 124 is often referred to as a torrent file 124. The torrent file 124 may contain information such as the URL of the tracker server (described below), suggested names for the individual blocks of the content file to be delivered, the block length used, and a hash code for each block, which clients can use to verify the integrity of the data they receive. Users of the clients 101-104 must first download the torrent file 124 before accessing the desired content file. The appropriate torrent file 124 may be located by the user in any conventional manner. For example, the user may already know the web addresses of one or more of the servers 111 and 112 so that they can contact them directly to download the torrent file 124, or the user may be linked to the torrent file 124 through a web page, or they may otherwise find the torrent file 124 by searching for it using an Internet search engine.

Each of the clients 101-104 is configured with a client version of a file sharing program (CPRG) 130. The client program 130 is used to download and open the torrent file 124. The client program 130 displays for the user one or more tracker servers, such as tracker servers 141 and 142, which coordinate the action of all the clients or peers. The tracker server only manages connections and does not have any knowledge of the contents of the files being distributed, and therefore a large number of users can be supported with a relatively limited tracker bandwidth. The tracker server maintains lists of clients currently participating in the file sharing process for the desired content file. The user then selects one of the identified tracker servers to contact in order to procure a copy of the content file. The client program 130 then establishes communication with the selected tracker server. The tracker server sends the client program 130 a list of other peers currently downloading blocks of the content file that the clients 101-104 desire.

As an example, if users of clients 101 and 102 select tracker server 141, their respective client programs 130 contact and communicate with the tracker program 150 of the tracker server 141. The tracker program 150 then sends a network list back to each of the connecting clients 101 and 102. Included in the network list is contact information for at least one "seed" client, such as client 104, which has a full copy of the content file that the clients 101 and 102 wish to procure, as well as contact information for clients such as clients 101 and 102 that have recently contacted the tracker server 141 regarding the content file. The client programs 130 of clients 101 and 102 then use the information in the provided network list to establish peer-to-peer communications with the seed client 104 and with one another in order to download the content file. The client connects to those peers to obtain the various blocks of the content file. Such a group of peers connected to each other to share a torrent is often called a swarm. If the swarm contains only the initial seeder, the client connects directly to it and begins to request blocks. As peers enter the swarm, they begin to trade blocks with one another, instead of downloading directly from the seed.

Initially, the seed client 104 may be the only client in the peer-to-peer network that has any of the blocks available for delivery. When a block is successfully downloaded to one of the clients, however, the client program 130 of that client announces to other clients that it now has a block available for downloading. As more clients join the peer-to-peer network along with the clients 101 and 102, this will further serve to speed up the distribution of the content file to all peer-to-peer network clients as they participate in the swarm download. Eventually, all of the blocks of the content file may be available within the peer-to-peer network from peers other than the seed client 104. At that time, the seed client 104 may disconnect itself from the peer-to-peer network.

Before announcing the availability of an assembled block that has been downloaded, the client program 130 will generally first verify that the assembled block is good. It does this, for example, by calculating a hash value for the assembled block and comparing the calculated hash value against a known hash value provided, for example, in the Torrent file 124. If the two hash values match, then the block is determined to be good. In this case, the other peer-to-peer clients are notified by the client program 130 of the assembled block's availability for downloading. On the other hand, if the two hash values do not match, then the block is determined to be corrupted. In this case, the individual blocks for that assembled block are discarded and requested again from the same or different sources (i.e., other clients on the peer-to-peer network). As clients successfully download all blocks of the content file, they may disconnect from the peer-to-peer network. At the same time, other clients may be joining the peer-to-peer network to download the content file from remaining peers in the peer-to-peer network. In order to be notified of such newly joining clients, as well as to maintain its own contact information in the network list, it is useful for a client already participating in a swarm download to periodically re-connect to the tracker server and obtain an updated network list.

Figure 2:
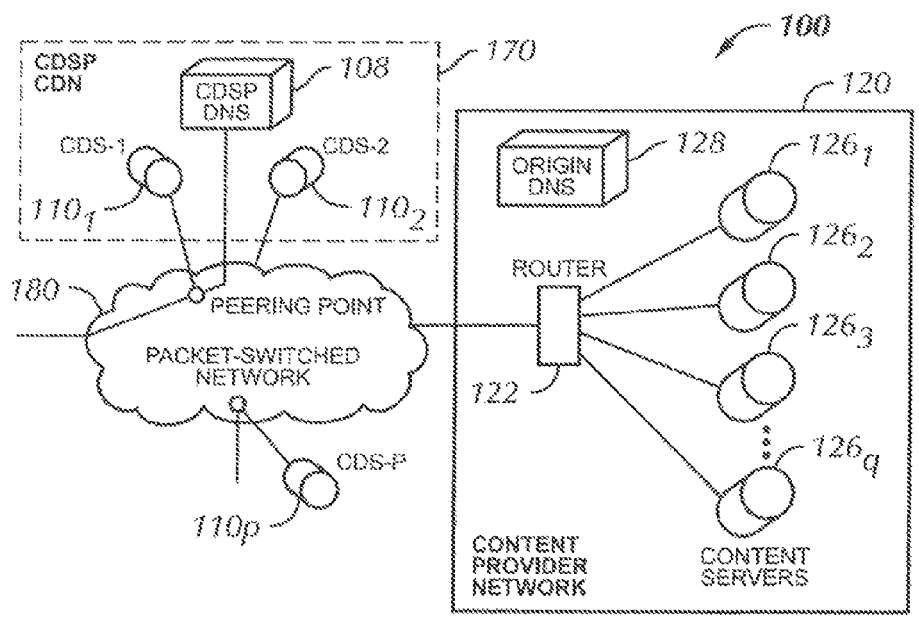
FIG. 2 depicts a high-level block diagram of one example of CDN network.

FIG. 2 depicts a high-level block diagram of one example of CDN network. In FIGS. 1 and 2, as well as the figures that follow, like elements denote are denoted by like reference numerals. The network 100 comprises clients 101-104, as in FIG. 1, at least one content delivery network (CDN) 170, which is operated by a content delivery service provider (CDSP), a packet switched network 180 (e.g., the Internet), and an originating content provider network 120.

Clients 101-104 are employed by users requesting content. The CDSP provides connectivity between clients 101-104 and the content provider network 120 via the CDN 170 and the packet-switched network 180. Although only one CDN 170 is illustratively shown in FIG. 1, one skilled in the art will appreciate that a plurality of CDNs 170 may be connected to the packet-switched network 180 to provide content to client computer devices.

The content provider network 120 comprises a plurality of content (origin) servers $126_1$, through $126_q$ (collectively content servers 126) and an originating domain name server (DNS) 128. In an instance where there are multiple content servers 126, as illustratively shown in FIG. 2, a router or switch 122 may be utilized to route information to and from the content server 126 associated with user requested content.

The content delivery network (CDN) 170 comprises a set of cache servers $110_1$ through $110_p$ (also referred to as "Content Delivery Servers" (CDSs), collectively CDSs 110) on the edge of the network 170, as well as a domain name server (DNS) infrastructure 108, which is used to route user requests to the nearest CDS 110. In operation, DNS requests sent from the clients 101-104 are directed to the DNS 108 of the CDSP 170. This may be accomplished, for example, by allowing the CDSP 170 to "takeover" the DNS functionality of the originating content provider network 120 so as to become the "authoritative DNS" for the originating site.

Content delivery service providers (CDSP) enable distribution of content from the originating sites (i.e., content servers 126) to the CDS servers 110 on the edge of the network 180, which in turn deliver content to the clients 101-104. The distribution mechanism may be based both on push technologies such as multicasting the data to all the edge servers through terrestrial or satellite links or pull technologies such as those used by proxies. The goal is to decrease the latency of user access to the content files by delivering the files from a CDS edge server closest to the user.

As previously mentioned, peer-to-peer networks and content delivery networks both have their advantages and disadvantages. For instance, CDNs require a great deal of bandwidth and server resources since the server must transmit the entire file to each client. As a result, the server is burdened with the entirety of the delivery costs of the content. CDNs, however, can best control the Quality of Service that is provided to the client. Peer-to-peer networks, on the other hand, reduce the burden placed on a centralized server by leveraging the available upstream bandwidth of the clients, but with less control over the Quality of Service that is delivered to the client.

The present invention uses a combination of a content delivery network model and a peer-to-peer network model to transfer files from a content originator to multiple clients to overcome the aforementioned problems and limitations. A number of questions should be answered to determine the optimal combination of the two network models to be used. In particular, it should first be determined how quickly the file needs to be sent to the client. It then needs to be determined how the data can be sent at the required speed with minimal cost.

In determining how quickly the file needs to be sent to the client a primary consideration is the type of medium that the client wishes to receive. For instance, if the content file is to be delivered in real-time (e.g., as a streaming media file) a higher throughput (e.g., bit rate) will be required than if the file is simply to be downloaded to the client. Once the required throughput is determined, it is compared to the throughput of the peer-to-peer network. If the throughput of the peer-to-peer network is sufficient, then this model is used to deliver the content file. On the other hand, if the throughput of the peer-to-peer network is insufficient, then the peer-to-peer network may still be used to deliver the file by supplementing its throughput by other techniques.

One way to supplement or augment the throughput of a peer-to-peer network is to employ what may be referred to as a backup peer server. The backup peer server, which contains a copy of the content file to be delivered, can be used as an additional peer to increase the throughput of the swarm. The backup peer server will be a seed client if it contains a complete copy of the content file to be delivered. The resources of the backup peer server need only be invoked when necessary to increase the throughput of the peer-to-peer network to deliver a particular content file.

Another way to supplement or augment the throughput of the peer-to-peer network is by using a content delivery network to deliver portions of the content files to the client. For instance, a portion of a content file may be reserved for delivery by the content delivery network. The reserved portion of the file may be some fraction (e.g., half) of the file or a certain number of blocks that would otherwise need to be delivered over the peer-to-peer network.

Figure 3:
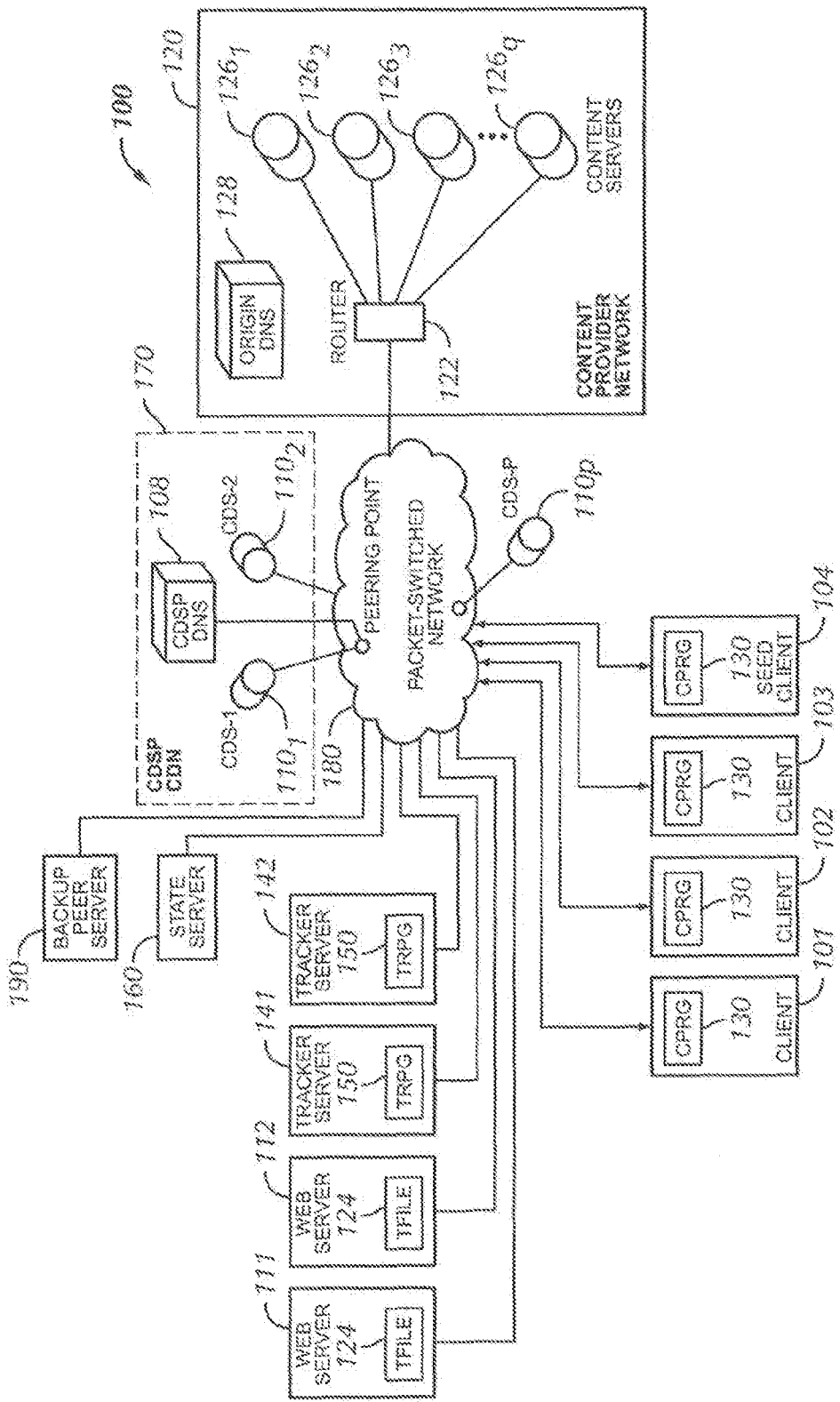
FIG. 3 shows a hybrid network that employs both peer-to-peer and content delivery models.

FIG. 3 shows the peer-to-peer and content delivery networks depicted in FIGS. 1 and 2, respectively, along with a state server 160 that is used to coordinate the activities of the two networks. The state server 160 monitors the throughput requirements of the content file and the throughput capacity of the peer-to-peer networks and invokes the resources of the content delivery network as necessary to deliver the content file in accordance with the file's throughput requirements. Also shown is a backup peer server 190 which can provide additional resources to the peer-to-peer network on an as-needed basis.

The state server 160 will typically be continuously monitoring the networks depicted in FIG. 3. Since individual peer clients may join/drop at will, the available throughput in the network will be constantly changing. In fact, the throughput of the various blocks of a file will in general differ from block to block. For instance, if two peer clients have all the blocks of a given file (say blocks 1-10, for example) two other peer clients have blocks 1 and 2, and yet two different peer clients have blocks 3 and 5, blocks 1, 2, 3 and 4 will have the highest available (6× client-speed), while pieces 5 to 10 will have lower throughputs (2× client-speed). This example assumes, of course, that the upload rates are the same for all the peer clients. For this reason the state server 160 should continuously monitor the throughput rates since they may dynamically vary in this manner.

Figure 4:
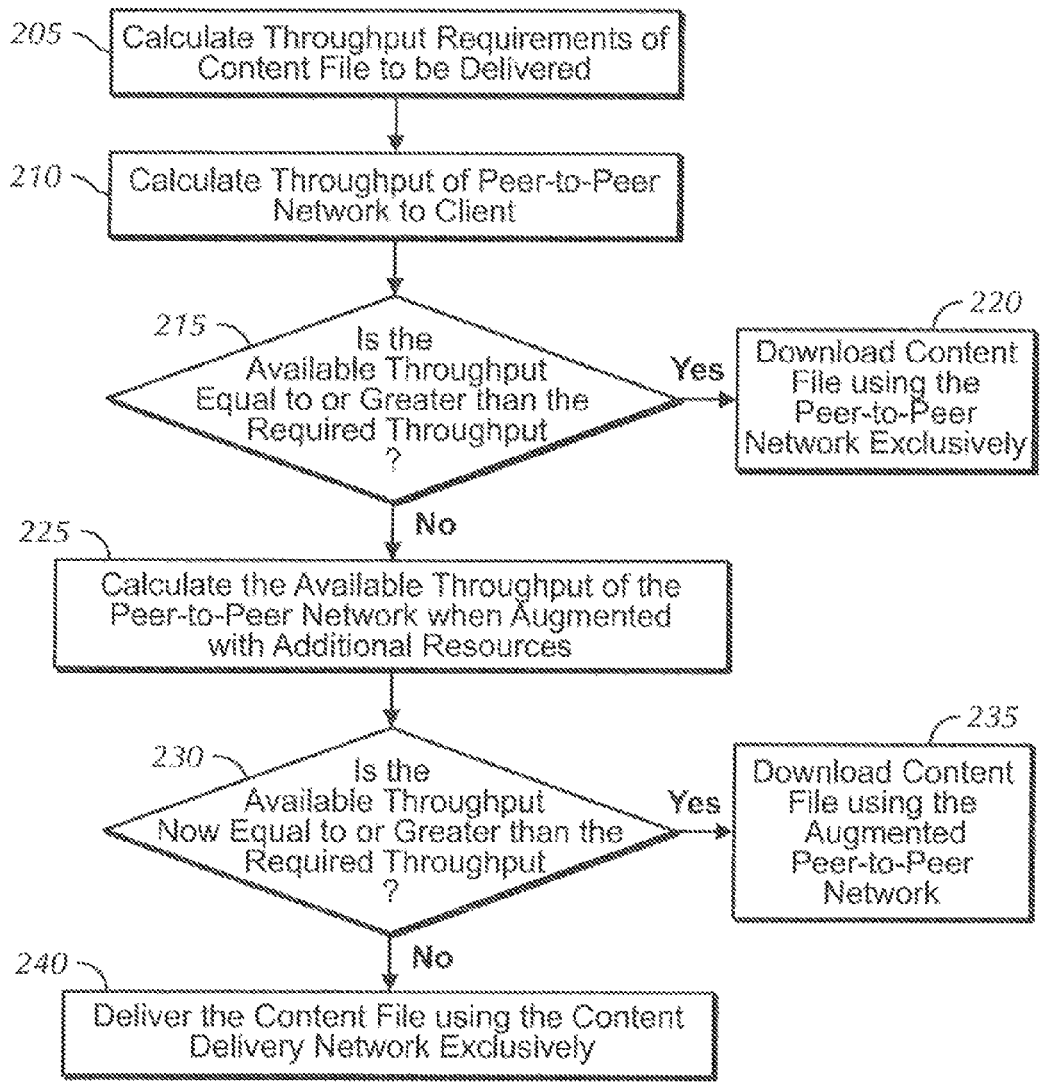
FIG. 4 is a flowchart showing one example of a process that may be employed to determine the best use of the resources of the hybrid network depicted in FIG. 3 to deliver a content file to a client.

FIG. 4 is a flowchart showing one example of a process that may be employed to determine the best use of network resources to deliver a content file to a client. The process begins in step 205 when the peer-to-peer network calculates the throughput requirements of a file that a client has requested for delivery. The calculation may be performed in accordance with any well-known technique by the tracker server or any other appropriate entity in the peer-to-peer network. The throughput requirement will in large part depend on whether the content is to be delivered in real-time or downloaded for subsequent use. Similarly, in step 210 the throughput of the peer-to-peer network is determined at the time the file is to be delivered. The throughput of the peer-to-peer network will depend on a number of things, most notably the sum of the available uplink bandwidth of the individual clients in the swarm. The required and available throughputs are compared at decision step 215. If the available throughput is about equal to or greater than the required throughput, then in step 220 the content file is downloaded using the peer-to-peer network exclusively. On the other hand, if at decision step 215 it is determined that the available throughput of the peer-to-peer network is not sufficient to deliver the file, then the process continues at step 225 in which the available throughput of the peer-to-peer network is determined when augmented by either a backup peer server or with the resources of a content delivery network. In decision step 230 the throughput of the augmented peer-to-peer network is compared to the required throughput. If the available throughput of the peer-to-peer network as augmented in this manner is sufficient, then the content file is delivered using the augmented peer-to-peer network in step 235. If the throughput of the augmented peer-to-peer network is still not sufficient to deliver the content file, then in step 240 the content delivery network is exclusively used to deliver the file.

Figure 5:
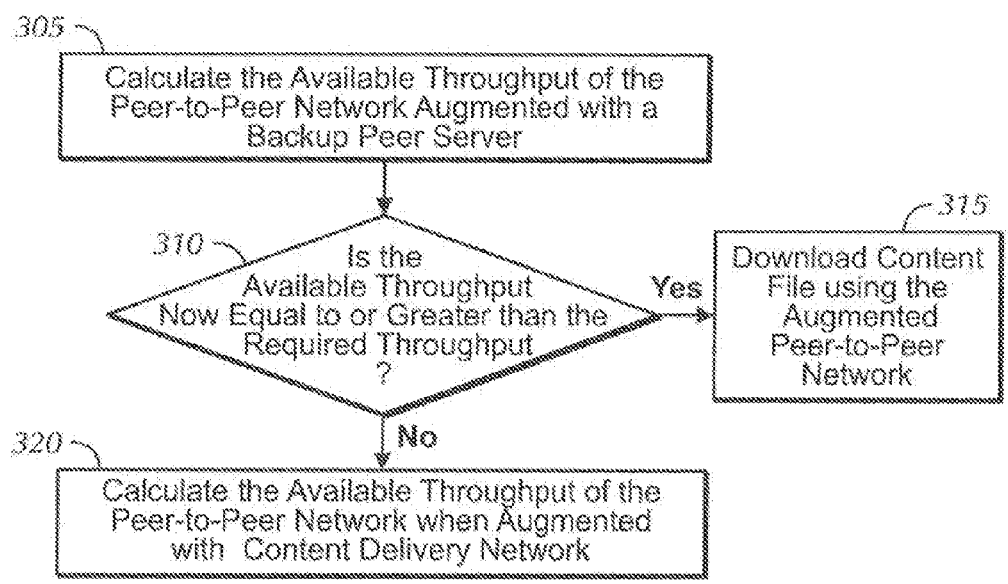
FIG. 5 is a flowchart showing in greater detail the step in the flowchart of FIG. 4 in which the available throughput of the peer-to-peer network is determined when augmented by either a backup peer server or with the resources of a content delivery network.

FIG. 5 is a flowchart showing in greater detail step 225 of FIG. 4, in which the available throughput of the peer-to-peer network is determined when augmented by either a backup peer server or with the resources of a content delivery network. In step 305 the available throughput of the peer-to-peer network is calculated when augmented with a backup peer server. The required and available throughputs are compared at decision step 310. If the available throughput is about equal to or greater than the required throughput, then in step 315 the content file is downloaded using the peer-to-peer network augmented with the backup peer server. On the other hand, if at decision step 310 it is determined that the available throughput of the peer-to-peer network augmented with the backup peer server is not sufficient to deliver the file, then the process continues at step 320 in which the available throughput of the peer-to-peer network is determined when augmented by with the resources of a content delivery network.

The content file to be delivered to clients in accordance with the techniques described above may be any type of file to be downloaded, streamed, or delivered over a communications network by any other means. Such files may include, without limitation, application programs and other executable files, data files, audio, video and multimedia files, operating system components, drivers, updates and the like. For example, in some embodiments the files that are downloaded may be software products associated with consumer electronic devices (e.g., personal computers, personal digital assistants (PDAs), video cameras, digital cameras, MP3 players), which software products are made available by the manufacturer or vendor of the consumer electronic devices.

The files or software products to be delivered to the client in some cases may be delivered in accordance with an associated service. For example, the client may contact a web site that provides a customer of a consumer electronic device with product updates, service updates, warranty information or otherwise manages a suite of services available to the customer. In another example, the files to be delivered may be content files (e.g., video) that a client uploads to a central server to be synchronized with other consumer electronic devices, stored and/or shared with other clients. Such content files may be delivered to other clients or consumer electronic devices in accordance with the techniques described herein. The service may also provide ancillary services to the customer, such as allowing the customer to register multiple consumer electronic devices, perform service authentication for each device and manage each of the devices. The consumer may also use the service to create a profile for managing the devices and synchronize content between and among them using the techniques described herein.

The invention claimed is:

1. A method for delivering a content file to a client over a packet-switched network, comprising:
   determining a suitable throughput required to deliver the content file to the client, wherein said determination includes a determination of a delivery method to be employed in connection with the content file, and is selected from the group consisting of a streaming media method or a file downloading method;
   determining a throughput available in a peer-to-peer network for delivering the content file to the client;
   comparing the required throughput to the available throughput;
   supplementing the available throughput with additional throughput, provided by a content delivery network, if the available throughput is less than the required throughput; and
   delivering the content to the client over the packet-switched network using the available throughput of the peer-to-peer network and additional throughput.

2. The method of claim 1 wherein further additional throughput is provided by a backup server that is employed as a peer in the peer-to-peer network on an as-needed basis.

3. The method of claim 2 wherein the backup server is configured to function as a seed client.

4. The method of claim 1 wherein delivery of the content to the client further comprises delivering one portion of the content file over the peer-to-peer network and a remaining portion of the content file over the content delivery network.

5. The method of claim 1 wherein the peer-to-peer network operates in accordance with a file transfer protocol selected from the group consisting of BitTorrent, Kazaa, eDonkey, Gnutella, and Direct Connect.

6. A method for delivering a content file to a client over a packet-switched network, comprising:
   determining a suitable throughput required to deliver the content file to the client, wherein said determination includes a determination of a delivery method to be employed in connection with the content file, and is selected from the group consisting of a streaming media method or a file downloading method
   determining a throughput available in a peer-to-peer network for delivering the content file to the client;
   comparing the required throughput to the available throughput;
   delivering the content to the client over the packet-switched network using the available throughput of the peer-to-peer network if the available throughput is at least equal to the required throughput;
   supplementing the available throughput with additional throughput, provided by a content delivery network, if the available throughput is less than the required throughput; and
   delivering the content to the client over the packet-switched network using the available throughput of both the peer-to-peer network and additional throughput if the available throughput of the peer-to-peer network is less than the required throughput.

7. The method of claim 6 wherein delivery of the content to the client further comprises delivering one portion of the content file over the peer-to-peer network and a remaining portion of the content file over the content delivery network.

8. The method of claim 6 wherein the peer-to-peer network operates in accordance with a file transfer protocol selected from the group consisting of BitTorrent, Kazaa, eDonkey, Gnutella, and Direct Connect.

9. A method for delivering a content file to a client over a packet-switched network, comprising:
   determining a suitable throughput required to deliver the content file to the client;
   determining a throughput available in a peer-to-peer network for delivering the content file to the client, wherein the peer-to-peer network allows users to share content files directly with other users;
   comparing the required throughput to the available throughput;
   supplementing the available throughput with additional throughput from a back-up peer server if the available throughput is less than the required throughput;
   determining a combined throughput available in the peer-to-peer network and the back-up peer server;
   comparing the required throughput to the combined throughput available;
   supplementing the available throughput with further additional throughput, provided by a content delivery network, if the available throughput is less than the required throughput, wherein the content delivery network employs a client-server protocol, and is configured such that a central server sends an entire content file to each client that requests the content file, and wherein clients do not communicate with each other over the content delivery network; and
   delivering the content to the client over the packet-switched network using the available throughput of the peer-to-peer network, the backup peer server, and additional throughput from the content delivery network.

10. The method of claim 9 wherein delivery of the content to the client further comprises delivering one portion of the content file over the peer-to-peer network, one portion over the back-up peer server, and a remaining portion of the content file over the content delivery network.

11. The method of claim 9 wherein the peer-to-peer network operates in accordance with a file transfer protocol selected from the group consisting of BitTorrent, Kazaa, eDonkey, Gnutella, and Direct Connect.

12. The method of claim 9 wherein the backup server is configured to function as a seed client.

13. The method of claim 9 wherein determining the required throughput of the content file includes a determination of a delivery method to be employed in connection with the content file.

14. The method of claim 9 wherein the delivery method is selected from the group consisting of a streaming media method or a file downloading method.

* * * * *